United States Patent [19]
Ueeda et al.

[11] Patent Number: 4,560,715
[45] Date of Patent: Dec. 24, 1985

[54] MICA FLAKE MASS AND RESIN COMPOSITION WITH THE SAME INCORPORATED THEREIN

[75] Inventors: Ryuhei Ueeda, Kurashiki; Kiyonobu Fujii, Mabi; Akira Kubotsu, Soja; Shunji Kaneda; Kenji Okuno, both of Kurashiki, all of Japan

[73] Assignee: Kuraray Co., Ltd., Kurashiki, Japan

[21] Appl. No.: 589,337

[22] Filed: Mar. 14, 1984

[30] Foreign Application Priority Data

Mar. 31, 1983 [JP] Japan .................................. 58-56911
May 12, 1983 [JP] Japan .................................. 58-83789

[51] Int. Cl.$^4$ .............................................. C08K 3/34
[52] U.S. Cl. .................................. 523/443; 523/513; 524/449; 106/291
[58] Field of Search ................ 524/449; 106/291; 523/443, 513

[56] References Cited

U.S. PATENT DOCUMENTS 3,799,799 3/1974 Woodhams et al. ................ 524/449
4,087,401 5/1978 Stayner .............................. 523/513
4,412,103 10/1983 Fujii et al. ........................... 524/449

*Primary Examiner*—Lewis T. Jacobs
*Attorney, Agent, or Firm*—Oblon, Fisher, Spivak, McClelland & Maier

[57] ABSTRACT

Incorporation in a thermoplastic resin of a mass of mica flakes having a median shape factor of not less than 0.76, an average particle size of not more than 2,000 μm and an average aspect ratio of not less than 10 followed by molding gives moldings which are high not only in mechanical strength but also in strength at weld parts. Incorporation of said mica flake mass in a thermosetting resin followed by molding affords moldings very high in strength as well as in modulus of elasticity.

9 Claims, 3 Drawing Figures

MICA FLAKE MASS AND RESIN COMPOSITION WITH THE SAME INCORPORATED THEREIN

BACKGROUND OF THE INVENTION

1. Field of the Invention

This invention relates to a mass of mica flakes which are specific in shape as well as a resin composition with the same incorporated therein. More particularly, it relates to a mass of mica flakes which can give, when incorporated in a thermoplastic resin, moldings which are excellent in mechanical strength, typically in tensile strength and bending strength, and at the same time are high in strength at weld parts and, when incorporated in a thermosetting resin, moldings which are high in strength and modulus of elasticity.

2. Description of the Prior Art

It is well known that reinforcement of plastic materials with a mica flake mass results in the production of moldings which are high in modulus of elasticity and rich in heat resistance, chemical resistance, electric insulator function and barrier function, among others. For instance, U.S. Pat. No. 3,764,456 and Canadian Pat. No. 893,163 disclose that addition of a mass of mica flakes having a high aspect ratio to a thermoplastic or thermosetting resin followed by molding gives moldings with high modulus and high strength.

However, when such a mica-filled thermoplastic resin is molded, especially by injection molding, the so-called welds may appear in the moldings. Occurrence of such welds in the molding rather leads to a decrease in strength at those parts as compared with the unreinforced resin. To avoid this drawback, attention has been paid to the designing of molds. However, careful designing of molds alone is not sufficient for the prevention of weld formation. Investigations from the resin composition viewpoint are also necessary. It is known that the strength at weld parts in a mica flake-filled thermoplastic resin depends on the diameter of mica flakes. Thus, the smaller the flake diameter, the more improved the strength at weld parts is. However, if the mica flake diameter is reduced so that the strength at weld parts might be increased, the aspect ratio necessarily becomes smaller and as a result the reinforcing effect contrarily decreases. There also arises a problem that the comminution cost for reducing the mica flake size markedly increases. A further problem is that, when the resin is a thermosetting one, incorporation of mica flakes into the thermosetting resin results in a remarkable increase in the viscosity of the resulting mixture, a decrease in the flowability, insufficient immersion, insufficient defoaming and insufficient filling, hence poor moldability, so that moldings having the desired characteristic properties cannot be obtained. As an attempt to solve these problems, there has been proposed, for instance, a method of avoiding the above troubles by admixing an unsaturated polyester in the powder form with mica flakes by the dry blend technique, and a method of preventing the troubles encountered at the time of blending which comprises putting mica flakes in a fibrous reinforcement and immersing the resulting composite reinforcement with a resin. However, the first method, namely dry blending of an unsaturated polyester with mica flakes, is disadvantageous in that powdery polyester resins are very unique resins and are not readily available and that the powdery dry blends are difficult to mold into other forms than the flat or sheet form. Accordingly, said method is not yet in practical use. The second method, which comprises preparing a composite reinforcement beforehand, is hardly applicable to the cases where the spray up method, premix method, BMC (bulk molding compound) method or SMC (sheet molding compound) method is used although it is useful in the cases where FRP (fiber-reinforced plastic) moldings are produced by the hand lay up method, preform matched die method, cold press method, continuous panel method or the like.

SUMMARY OF THE INVENTION

The primary object of the invention is to provide a mass of mica flakes which, when added to a thermoplastic resin, is capable of giving moldings having high strength at weld parts, without sacrificing the reinforcing effect, and, when added to a thermosetting resin, can cause decrease in the viscosity of the composition, increase in the flowability and avoid insufficient immersion, insufficient filling and other causes of poor moldability. Another object of the invention is to provide a resin composition filled with such mass of mica flakes and having advantageous properties such as mentioned above.

These objects are accomplished by providing a mass of mica flakes characterized by a median shape factor of not less than 0.76, an average particle size (diameter of flake) of not more than 2,000 $\mu$m and average aspect ratio of not less than 10 and a resin composition filled with such mass of mica flakes.

BRIEF DESCRIPTION OF THE DRAWINGS

The term "space factor" as used herein is defined as the ratio of the product of the area (S) of the image of a mica flake as projected from above and $4\pi$ to the square of the circumference (l) of said image, namely $4\pi S/l^2$. For a circle, for instance, the shape factor is 1, for a regular square 0.785, and for a regular triangle 0.605.

The area and circumference of the projected figure of said mica flake can be determined in the following manner. First, a scanning electron microphotograph of mica flakes is taken. Then, the circumference of each flake and the area surrounded by the circumference are measured using a commercially available image analyzer.

Figure 1:
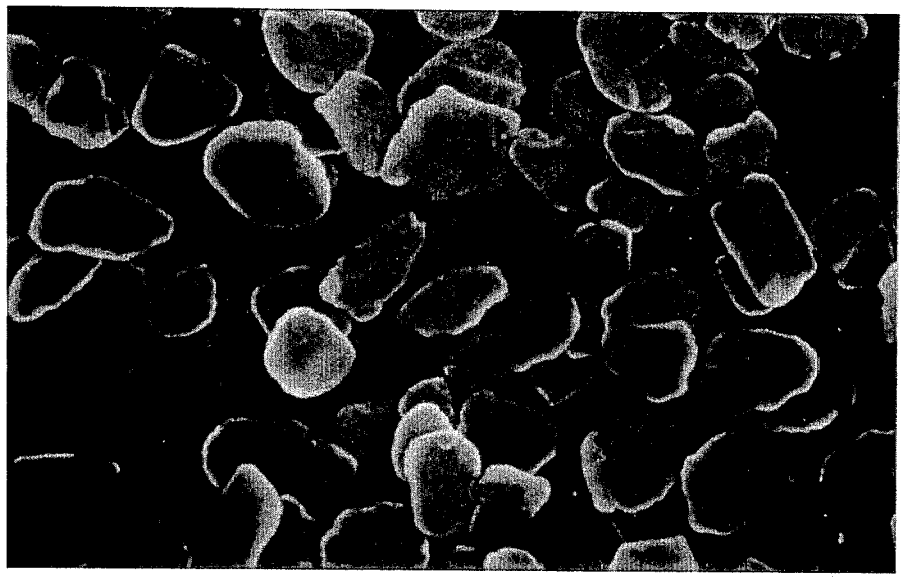
Figure 2:
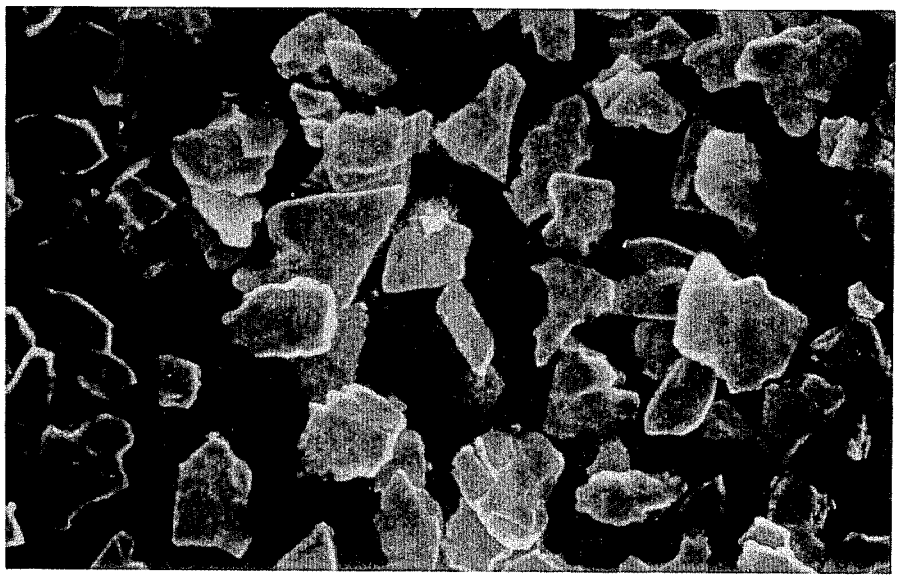
Figure 3:
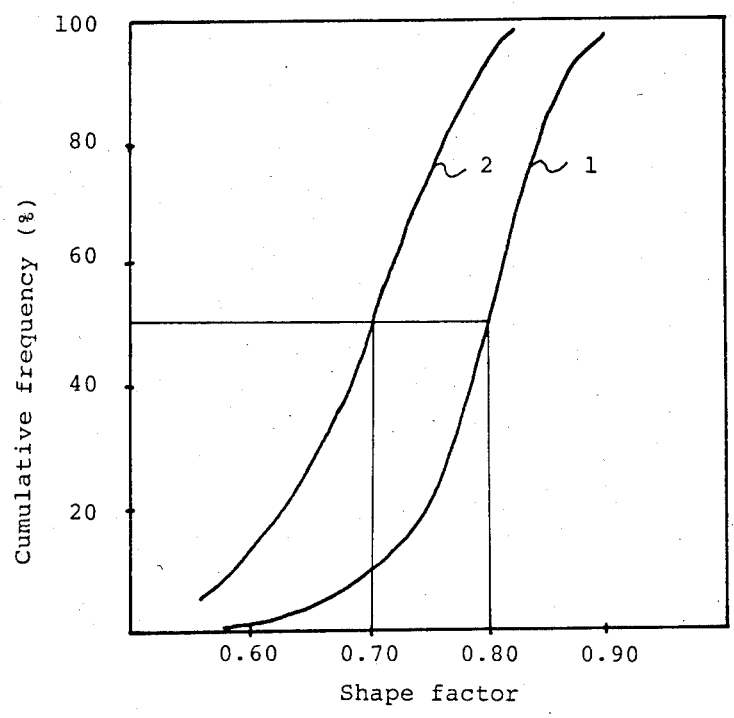

In the accompanying drawings, FIG. 1 and FIG. 2 each is a scanning electron photomicrograph (multiplication: $\times 190$) of mica flakes. The shape factor for each mica flake is calculated from the area and circumference as measured in the above manner and a cumulative shape factor frequency curve is drawn, as shown in FIG. 3. The shape factor at which the cumulative frequency reaches half of the number of mica flakes measured, that is the median shape factor, is regarded as representing the mass of mica flakes in question. For higher accuracy, the number of particles to be measured should desirably amount to 300 or more. For reflecting the whole mass of mica flakes as faithfully as possible, the sample for measurement should preferably be taken by exact reduction using, for example, a rotary splitter.

DETAILED DESCRIPTION OF THE INVENTION

The mass of mica flakes according to the invention, which is to be added to a resin to give a resin composition according to the invention, has a median shape factor of not less than 0.76, an average particle size of not more than 2,000 μm and an average aspect ratio of not less than 10. For achieving the objects of the invention more remarkably, it is in particular desirable that the number of mica flakes having a shape factor of not more than 0.70 per 100 mica flakes should be not more than 20, more preferably not more than 15.

Generally, naturally occurring or synthetic mica occurs as very large laminates. For use of mica as a filler for resins, such large laminates are ground or pulverized either by the wet method or by the dry method, using a pulverizer capable of imparting a fairly high level of impact energy to mica, such as a jet mill type fine grinding machine or a water jet machine (cf. the U.S. patent cited above and U.S. Pat. No. 4,026,384). This is because, since mica for use in resin compositions is required to be very finely divided, a method of grinding mica by imparting high impact energy to mica is essential for efficient preparation of finely divided mica. The mica flakes obtained by such conventional method are very irregular in shape, as shown in FIG. 2, and necessarily have a median shape factor within the limited range of about 0.65–0.73. On the contrary, in accordance with the invention, mica is ground using a pulverizer capable of grinding mica with weak impact energy and at the same time rounding off sharp edges, such as a fine micron mill type pulverizer, so that there can be obtained a mica flake mass having a median shape factor of not less than 0.76, as shown in FIG. 1. While the mica flake mass according to the invention which has a median shape factor of not less than 0.76 can be obtained in an efficient manner by using the above-mentioned fine micron mill type pulverizer, the scope of the invention is never limited to the use of the above pulverizer alone. Any grinding method may be used only if it gives a mass of mica flakes having the above-specified particularity in shape. In the practice of the invention, it is particularly preferred that the mica flake mass should have a shape factor of not less than 0.78.

In practicing the invention, it is not enough for achieving the objects of the invention that the mica flake mass meets the requirement with respect to the shape factor alone. As mentioned above, not only the shape factor but also the average particle size and average aspect ratio must be within the above-specified respective ranges. Thus, if the average particle size exceeds 2,000 μm, the mica flake-filled resin composition will be poor in moldability and the moldings obtained will be poor in surface smoothness. The average particle size should preferably be not more than 500 μm. Furthermore, the average aspect ratio, namely the ratio of the average mica flake diameter to the average thickness, must be not less than 10. When said ratio is less than 10, the final moldings will be low in strength as well as in modulus of elasticity. It is in particular preferable that the mica flake-mass should have an average aspect ratio of not less than 15. The average particle size of a mica flake mass is determined by classifying the mass using JIS standard shieves, plotting the results on the Rosin-Rammler diagram and multiplying the 50% particle size found by $\sqrt{2}$. The average aspect ratio can be determined by measuring the compressed area of a monoparticulate film of the flake spread on a water surface. This measuring method is described in detail in Zairyo (Materials), 27, 298 (1978). The above measuring methods are not unique but all are commonly used in the art in the measurement of mica flakes.

The mica to be used in accordance with the invention includes, among others, muscovite, phlogopite, biotite and fluorophlogopite or synthetic mica.

The resin in which the mica flake mass according to the invention can be incorporated includes thermoplastic resins, typically polyolefins such as polyethylene and polypropylene, polyamides such as nylon-6 and nylon-66 and polyesters such as polyethylene terephthalate and polybutylene terephthalate, and thermosetting or thermocurable resins, typically saturated polyester resins, unsaturated polyester resins, vinyl ester resins, epoxy resins and phenol resins.

For a thermoplastic resin, the mica flakes are used generally in an amount of 0.1–4 parts by weight per part by weight of resin and, for a thermosetting resin, generally in an amount of 0.03–3 parts by weight per part by weight of resin. At lower mica flake addition levels than the above respective ranges, the effects of the invention will be insignificant. Conversely, at addition levels exceeding the above ranges, the moldability of the resin composition will be impaired.

In blending the mica flakes with the resin, the mica flakes may be treated with a silane for increasing the interfacial affinity or compatibility between each mica flake and the resin. Thus, the affinity between the resin and mica flakes can be increased by applying an organic silane compound, such as γ-methacryloxypropyltrimethoxysilane, vinyltrichlorosilane, vinyltrimethoxysilane, vinyltriacetoxysilane, γ-chloropropyltrimethoxysilane or γ-aminopropyltriethoxysilane, followed by drying. This treatment results in an increase in strength of the moldings. In cases where a thermoplastic resin is used, an alternative method of silane treatment which comprises prior addition of an organic silane compound to the resin may also be employed. The organic silane compound is added generally in an amount within the range of 0.1–3 percent by weight on the mica flake basis.

In blending the mica flakes with the resin, a titanium compound, for example an organic titanium compound such as tetra(i-propoxy)titanium or tetra(n-butoxy)titanium, may be added as an agent for promoting dispersion of mica.

The resin composition according to the invention may further contain a fibrous reinforcing material. Especially when the resin is a thermosetting resin, addition of a fibrous reinforcement results in markedly improved strength and shock resistance. Usable fibrous reinforcements include, among others, glass fibers, carbon fibers, metal fibers, organic fibers (e.g. vinylon fibers, polyester fibers), and naturally occurring inorganic fibrous materials (e.g. asbestos, barium titanate). These may be used either alone or in combination of two or more. They may also be subjected to silane treatment such as mentioned above for increasing the compatibility with resins. The fibrous reinforcement is used in an amount which varies markedly depending on the method of molding, hence cannot be specified in a general manner. Generally, however, for a thermoplastic resin, it is used in an amount of 0.03–0.5 part by weight per part by weight of resin and, for a thermosetting resin, in an amount of 0.03–10 parts by weight per part by weight of resin.

The resin composition according to the invention may further contain one or more of various other reinforcements and/or fillers, such as talc, calcium carbonate and wollastonite and/or one or more of known additives such as colorants, lubricants, stabilizers, plasticizers and antistatic agents, without undergoing any adverse effects.

Moldings can be produced from the mixture of the mica flakes and a resin, with or without a fibrous reinforcement, with an additive or additives such as mentioned above added as necessary, in the conventional manner by injection molding or by some other adequate method of molding such as extrusion, compression molding or calendering when the resin is a thermoplastic resin, or by the hand lay-up, spray-up, preform matched die, cold press, continuous panel, SMC, premix or BMC molding method or further by a method of molding via prepregs when the resin is a thermosetting resin.

In the case of a thermosetting resin, molding of the resin composition with the mica flake mass according to the invention incorporated therein gives moldings having desired physical properties, without marked increase in the viscosity of the composition, therefore with a satisfactory extent of defoaming during molding, and without insufficient immersion, insufficient filling or other molding troubles. It is a further effect of the invention that such mica flakes that are specific in shape are scarcely damaged or broken even when a method of molding which involves thorough kneading following viscosity increase, such as the premix, BMC or SMC molding method, is used. As a result, there can be obtained moldings having very excellent performance characteristics.

The resin composition according to the invention can be molded into any of the shapes which can currently attainable with thermoplastic and thermosetting resins, such as machine parts, various electric device parts, and further small-sized ships, bathtubs, automobile parts, and tanks, amongst others.

The following examples illustrate the invention in further detail. However, they are by no means limitative of the invention. Unless otherwise specified, "part(s)" and "%" are "part(s) by weight" and "percent by weight", respectively.

EXAMPLES 1 AND 2 AND COMPARATIVE EXAMPLE 1

Phlogopite was pulverized in a fine micron mill type pulverizer (Hosokawa Micron Corporation), followed by air classification for cutting a finest-grained fraction (10%). There were obtained phlogopite flakes having an average flake diameter of 40 $\mu$m, a median shape factor of 0.80 and an aspect ratio of 30 (FIG. 1). The number of those mica flakes that had a shape factor of not more than 0.70 per 100 mica flakes was 7. The shape factor of the mica mass was determined from a scanning electron photomicrograph thereof using an image analyzing system (MOP-VIDEOPLAN; Kontron Co.) for measuring the area and circumference. The cumulative frequency curve for the shape factor is shown in FIG. 3. As a thermoplastic resin, there was used a mixture of 4 parts of isotactic polypropylene and 1 part of carboxyl-modified polypropylene. The mica mass-to-resin ratio was 40/60. The mica-resin mixture was fed to a uniaxial extruder in which said mixture was melted at 230° C. and kneaded. The thus-obtained pellets were injection molded to give test specimens for the measurement of tensile strength, bending strength and strength at weld parts. The specimens for tensile strength and bending strength measurements had the shapes and sizes as specified by ASTM D 638 and ASTM D 790, respectively. The shape and size of the specimens for the strength-at-weld-parts measurement were as described in Kobunshi Ronbunshu (Collected Papers on High Polymers) (edited by the Kobunshi Gakkai), 38, 209 (1981). The physical properties of these specimens as measured are shown in Table 1 (Example 1).

The same resin mixture as used in Example 1 was blended with phlogopite pulverized in a jet mill and having an average flake diameter of 38 $\mu$m, an aspect ratio of 28 and a median shape factor of 0.70 and test specimens were prepared in the same manner as in Example 1. The physical properties as measured in the same manner are shown in Table 1 (Comparative Example 1). In Comparative Example 1, the number of those flakes that had a shape factor of not more than 0.70 per 100 flakes was 50. The cumulative frequency curves for the mica flakes used in Example 1 and Comparative Example 1 are shown in FIG. 3.

In a further example (Example 2), the mica flakes as used in Example 1 were silane-treated beforehand with $\gamma$-(2-aminoethyl)aminopropyltrimethoxysilane in an amount of 2.0% on the mica flake basis, and then blended with the same resin mixture in the same manner as in Example 1, followed by preparation of test specimens and measurement of physical properties. The results obtained also are shown in Table 1.

TABLE 1

|  | Tensile strength (kg/cm²) | Bending strength (kg/cm²) | Strength at weld parts (kg/cm²) |
|---|---|---|---|
| Example 1 | 480 | 820 | 270 |
| Example 2 | 500 | 830 | 290 |
| Comparative Example 1 | 485 | 800 | 210 |

It is evident from the above results that the use of the mica flakes according to the invention results in almost the same tensile strength and bending strength data as compared with the conventional mica flakes but in a sharp increase in the strength at weld parts and that silane treatment improves the tensile strength and bending strength as well.

EXAMPLE 3 AND COMPARATIVE EXAMPLE 2

Phlogopite was ground using the same pulverizer as used in Example 1, followed by cutting a finest-grained fraction (5%) and a coarsest fraction (30%) by air classification. There were obtained phlogopite flakes with an average flake diameter of 20 $\mu$m, an aspect ratio of 30 and a median shape factor of 0.78. The shape factor measurement was conducted in the same manner as in Example 1. The number of those flakes having a shape factor of not more than 0.70 per 100 flakes was 11. The mica flakes (40 parts by weight) were blended with 60 parts by weight of the same resin mixture as used in Example 1, followed by test specimen preparation and physical properties measurement in the same manner as in Example 1. The results obtained are shown in Table 2 (Example 3).

Phlogopite pulverized in a roller mill and having an average flake diameter of 20 $\mu$m, an aspect ratio of 31 and a median shape factor of 0.68 was blended with the same resin as used in Example 3 in the same manner as in Example 3. Test specimens were prepared and tested for physical properties. The results obtained are shown in Table 2 (Comparative Example 2). In Comparative Example 2, the number of those flakes that had a shape factor of not more than 0.70 per 100 flakes was 55.

TABLE 2

|  | Tensile strength (kg/cm²) | Bending strength (kg/cm²) | Strength at weld parts (kg/cm²) |
| --- | --- | --- | --- |
| Example 3 | 460 | 740 | 290 |
| Comparative Example 2 | 450 | 720 | 230 |

From the above results it is evident that the invention brings about a sharp increase in the strength at weld parts with the tensile strength and bending strength remaining almost at comparable levels.

EXAMPLE 4 AND COMPARATIVE EXAMPLE 3

As a thermoplastic resin, there was used 40 weight parts of nylon 6 with a relative viscosity of 2.6. Muscovite flakes (60 weight parts) prepared by grinding in the same pulverizer as used in Example 1 followed by cutting a finest-grained fraction (10%) by air classification, which had an average flake diameter of 45 μm, an aspect ratio of 45 and a median shape factor of 0.78, were blended with said resin. The shape factor measurement was conducted in the same manner as in Example 1. In said mica flake mass, the number of those flakes that had a shape factor of not more than 0.70 per 100 flakes was 15. The resin-mica mixture was fed to a uniaxial extruder, in which the mixture was melted at 260° C. and kneaded to give pellets. The pellets were made into test specimens in the same manner as in Example 1. After thorough drying, they were tested for physical properties. The results thus obtained are shown in Table 3 (Example 4).

Muscovite ground in a jet mill to an average flake diameter of 43 μm, an aspect ratio of 47 and a median shape factor of 0.65 was admixed with the same resin as used in Example 4 in the same manner as in Example 4. In the muscovite flake mass, the number of those flakes that had a shape factor of not more than 0.70 per 100 flakes was 60. The mixture was made into pellets in the same manner as in Example 4, and test specimens were prepared from the pellets and tested for physical properties. The results obtained are shown in Table 3 (Comparative Example 3).

TABLE 3

|  | Tensile strength (kg/cm²) | Bending strength (kg/cm²) | Strength at weld parts (kg/cm²) |
| --- | --- | --- | --- |
| Example 4 | 1000 | 1600 | 480 |
| Comparative Example 3 | 1100 | 1500 | 370 |

The above results clearly indicate that the invention brings about a marked increase in the strength at weld parts although the tensile strength and bending strength remain almost unaltered.

EXAMPLE 5 AND COMPARATIVE EXAMPLE 4

Phlogopite was ground in the pulverizer as used in Example 1, followed by air classification for cutting a finest-grained fraction (20%). There was obtained a phlogopite flake mass having an average flake diameter of 60 μm, an aspect ratio of 33 and a median shape factor of 0.81. The shape factor measurement was performed in the same manner as in Example 1. The number of those flakes that had a shape factor of not more than 0.70 per 100 flakes was 7. Forty weight parts of the mica flake mass was blended with 60 weight parts of polybutylene terephthalate having a melt flow rate of 12 g/10 minutes, and test specimens were prepared in the same manner as in Example 1 and tested for physical properties. The results obtained are shown in Table 4 (Example 5).

For comparison, 40 weight parts of phlogopite flake mass prepared by grinding in a Disperse Mill (Hosokawa Micron Corporation) and having an average flake diameter of 57 μm, an aspect ratio of 33 and a median shape factor of 0.70 was admixed with 60 weight parts of the same resin as used in Example 5, and test specimens were prepared in the same manner as in Example 5 and tested for physical properties. The results obtained are shown in Table 4 (Comparative Example 4). The mica flake mass used in this comparative example had a shape factor of 0.70.

TABLE 4

|  | Tensile strength (kg/cm²) | Bending strength (kg/cm²) | Strength at weld parts (kg/cm²) |
| --- | --- | --- | --- |
| Example 5 | 840 | 1300 | 360 |
| Comparative Example 4 | 820 | 1300 | 280 |

Comparison between Example 5 and Comparative Example 4 clearly indicate that the invention brings about a sharp increase in the strength at weld parts although the tensile strength and bending strength are almost unlatered.

EXAMPLE 6 AND COMPARATIVE EXAMPLE 5

Phlogopite was ground in the pulverizer as used in Example 1, followed by cutting a 10% finest-grained fraction by air classification, giving a mica flake mass having an average flake diameter of 80 μm, an aspect ratio of 50 and a median shape factor of 0.82. Said mica flake mass was admixed with the same resin as used in Example 1 in a 20/80 weight ratio, and test specimens were prepared in the same manner as in Example 1 and tested for physical characteristics. The results obtained are shown in Table 5 (Example 6). In said mica flake mass, the number of those flakes that had a shape factor of not more than 0.70 per 100 flakes was 5.

The same resin as used in Example 1 was blended with a phlogopite flake mass prepared by grinding phlogopite in a jet mill and having an average flake diameter of 80 μm, an aspect ratio of 53 and a median shape factor of 0.69, in the same manner as in Example 6, and test specimens were prepared and tested for physical characteristics. The results obtained are shown in Table 5 (Comparative Example 5). The mica flake mass used in Comparative Example 5 contained 52 flakes having a shape factor of not more than 0.70 per 100 flakes.

TABLE 5

|  | Tensile strength (kg/cm²) | Bending strength (kg/cm²) | Strength at weld parts (kg/cm²) |
| --- | --- | --- | --- |
| Example 6 | 390 | 690 | 350 |
| Comparative Example 5 | 400 | 690 | 300 |

It is evident from the above results that the moldings produced with the mica flake mass according to the invention incorporated therein have a markedly increased strength at weld parts although they are almost comparable in tensile strength and bending strength to the moldings produced in the conventional manner.

EXAMPLE 7 AND COMPARATIVE EXAMPLE 6

An SMC was prepared by spreading a resin liquid over a polyethylene film, sprinkling the same mica flakes as used in Example 1 thereover, placing thereon another polyethylene film with the resin liquid spread thereon and pressing the whole so as to effect immersion of the mica flakes with the resin liquid and simultaneous viscosity increase. The resin liquid used was a mixture of 100 parts of an unsaturated polyester resin (Rigolac 2053, product of Showa Highpolymer Co., Ltd.), 1 part of zinc stearate, 1.5 parts of tertiarybutyl peroxide (hereinafter, TBP), 0.04 part of parabenzoquinone (hereinafter, PBQ) and 1.5 parts of magnesium oxide.

The mica flakes were contained in the composition in an amount of 60 percent by weight. This SMC was press-molded at 130° C. for 15 minutes, followed by after-cure at 100° C. for 2 hours, to give a 5 mm thick flat sheet. The sheet was tested for physical properties. The results obtained are shown in Table 6. The bending characteristics were determined in accordance with ASTM D 790 and the Izod impact strength (notch strength) was determined in accordance with ASTM D 256 (Example 7).

For comparison, phlogopite was ground in a jet mill, followed by air classification, giving a mica flake mass having an average flake diameter of 39 μm, as aspect ratio of 29 and a shape factor of 0.70 with the number of those flakes that had a shape factor of not more than 0.70 per 100 flakes being 50. Said mica flake mass and the same thermosetting resin as used in Example 7 were used and tests were performed in the same manner as in Example 7 (Comparative Example 6). In this comparative example, it was very difficult to effect immersion of the mica flakes with the resin liquid. The physical characteristics as measured are shown in Table 6. The effects of the invention are evident from the data shown.

TABLE 6

|  | Bending strength (kg/cm$^2$) | Flexural modulus (kg/cm$^2$ × 10$^4$) | Izod notch impact strength (kg · cm/cm) |
|---|---|---|---|
| Example 7 | 1890 | 34.0 | 4.5 |
| Comparative Example 6 | 920 | 15.1 | 3.0 |

EXAMPLE 8 AND COMPARATIVE EXAMPLE 7

A BMC was prepared using a double arm type kneader. The resin liquid used was a mixture of 100 parts of an unsaturated polyester resin (Rigolac 2053; Showa Highpolymer Co., Ltd.), 1 part of zinc stearate, 0.1 part of cobalt naphtenate, 1.5 parts of TBP, 0.04 part of PBQ and 3 parts of MgO. A mica flake mass was prepared from muscovite by grinding and classifying in the same manner as in Example 1. The mass had an average grain diameter of 14 μm, a shape factor of 0.81 and an aspect ratio of 22, with the number of those flakes that had a shape factor of not more than 0.70 per 100 flakes being 5. Glass fibers (¼" chopped strands) were used combinedly. The resin liquid, mica flakes and glass fibers were used in the weight ratio of 35:50:15. The double arm type kneader was rotated at the rate of 35 rpm and stirring was conducted for 10 minutes. The BMC thus obtained was press-molded into a flat sheet, cured at 130° C. for 15 minutes and after-cured at 100° C. for 2 hours, and test specimens for strength measurement were prepared from the molding. Separately, part of the molding was burned in an electric oven and the mica flakes were recovered and measured for the average grain diameter and aspect ratio. The physical characteristics of the molding and the characteristics of the recovered mica flakes are shown in Table 7 (Example 8).

For comparison, muscovite was ground in a jet mill. After classification, there was obtained a mica flake mass having an average grain diameter of 15 μm, a shape factor of 0.74 and an aspect ratio of 23, with the number of those flakes that had a shape factor of not more than 0.74 per 100 flakes being 35. Using this mica flake mass, tests were conducted in the same manner as in Example 8. The mica flakes in the molding were recovered and measured for the average grain diameter and aspect ratio. The results obtained are shown in Table 7 (Comparative Example 7). In the comparative example, the immersibility of the mica flakes was poor. Moreover, mica flake breakage occurred to a great extent during kneading, so that the physical properties were reduced to a remarkable extent.

TABLE 7

|  | Moldings | | | Recovered mica | |
|---|---|---|---|---|---|
|  | Bending strength (kg/cm$^2$) | Flexural modulus (kg/cm$^2$ × 10$^4$) | Izod notch impact strength (kg · cm/cm) | Average flake diameter (μm) | Aspect ratio |
| Example 8 | 1950 | 25.5 | 45 | 15 | 20 |
| Comparative Example 7 | 1010 | 14.1 | 47 | 7 | 14 |

EXAMPLE 9 AND COMPARATIVE EXAMPLE 8

A laminated sheet was produced by the hand lay-up method. The mica flakes used were phlogopite flakes as prepared by grinding and classifying in the same manner as in Example 1 and having an average grain diameter of 300 μm, an aspect ratio of 70 and a shape factor of 0.79, with the number of those flakes that had a shape factor of not more than 0.70 per 100 flakes being 10. The resin liquid used was a mixture of 100 parts of an unsaturated polyester resin (Upica 2035, product of Japan Upica Co., Ltd.) and 0.9 part of methyl ethyl ketone peroxide. The mica flakes and resin liquid were blended well in the weight ratio of 20:80 to give a liquid mixture having a viscosity of 9.5 poises. Immersion of a chopped glass strand mat with the above liquid mixture gave a 60:15:25 (by weight) mixture of resin liquid, mica flakes and glass fibers. Since the liquid mixture had a low viscosity, the immersibility was good. After three-layer lamination in a half-cured state, the laminate was cured at ordinary temperature for 24 hours and then after-cured at 80° C. for 4 hours. The thus-produced laminated sheet of unsaturated polyester resin (4.8 mm thick;

glass fiber content 25 weight percent; mica flake content 15 weight percent) were tested for performance characteristics. The results obtained are shown in Table 8 (Example 9).

For comparison, a laminated sheet was produced in the same manner as in Example 9 except that Suzorite mica 60-S (distributed by Kuraray Co., Ltd.) was used as the mica flake mass. The mica flake mass used had an average flake diameter of 280 μm, an aspect ratio of 75 and a shape factor of 0.68, with the number of those flakes that had a shape factor of not more than 0.70 per 100 flakes being 52. When the mica flakes were admixed with the resin liquid in the weight ratio of 20:80, the viscosity increased markedly, reaching 45 poises. In immersing the mat with the mixture, the immersibility was very poor. The laminated sheet produced in the same manner as in Example 9 was tested for physical characteristics. The results thus obtained are shown in Table 8 (Comparative Example 8). From the results shown, the effects of the invention are evident.

TABLE 8

|  | Bending strength (kg/cm$^2$) | Flexural modulus (kg/cm$^2$ × 10$^4$) | Izod notch impact strength (kg · cm/cm) |
|---|---|---|---|
| Example 9 | 2200 | 17.2 | 60 |
| Comparative Example 8 | 1600 | 12.5 | 60 |

EXAMPLE 10 AND COMPARATIVE EXAMPLES 9 & 10

A prepreg composed of mica flakes, glass cloth and epoxy resin was produced. The mica flakes used were mica flakes prepared by grinding phlogopite and having a grain diameter of 220 μm, an aspect ratio of 70 and a shape factor of 0.78, with the number of those flakes that had a shape factor of not more than 0.70 per 100 flakes being 15. The resin liquid used was a mixture of 100 parts of an epoxy resin (Epikote 828, product of Shell Chemical Co.), 100 parts of methyl ethyl ketone, 20 parts of 3,3'-diaminodiphenyl sulfone and 1 part of boron trifluoride-monoethylamine complex (BF$_3$-400, product of Hashimoto Kasei Kogyo Co., Ltd.). A 200 g/m$^2$ glass cloth (WE-18K-104BZ-2, product of Nittobo Co., Ltd.) was immersed in a 30:70 (by weight) mixture of the mica flakes and resin liquid, then squeezed by means of a roller, and dried (for evaporation of the methyl ethyl ketone) to give a prepreg composed of mica flakes, resin and glass cloth in the weight ratio of 20:30:50. The prepreg was made into a four-layer laminate, and the laminate was heated at 160° C. for 20 minutes and immediately thereafter pressed at 160° C. under a pressure of 5 kg/cm$^2$ for 30 minutes. After-cure was effected at 180° C. for 2 hours. The thus-obtained 1.8 mm thick epoxy laminated sheet was tested for performance characteristics. The results obtained are shown in Table 9 (Example 10).

For comparison, a laminated sheet was produced in the same manner as in Example 10 except that the mica flakes used were mica flakes prepared by grinding phlogopite in a roller mill and having an average flake diameter of 230 μm, an aspect ratio of 65 and a median shape factor of 0.68, with the number of those flakes that had a shape factor of not more than 0.70 per 100 flakes being 53. The results of physical characteristics measurements are shown in Table 9 (Comparative Example 9).

For further comparison, using the same resin liquid and glass cloth as those used in Example 10, a prepreg composed of the resin and glass cloth in the weight ratio of 50:50 was prepared. A laminated sheet was produced in the same manner as in Example 10 and tested for physical characteristics. The results obtained are shown in Table 9 (Comparative Example 10).

TABLE 9

|  | Bending strength (kg/cm$^2$) | Flexural modulus (kg/cm$^2$ × 10$^4$) | Izod notch impact strength (kg · cm/cm) |
|---|---|---|---|
| Example 10 | 5050 | 28.5 | 105 |
| Comparative Example 9 | 2010 | 10.8 | 110 |
| Comparative Example 10 | 4900 | 17.0 | 90 |

What is claimed is:

1. A mass of mica flakes characterized by a median shape factor of not less than 0.76, an average particle size of not more than 2,000 μm and an average aspect ratio of not less than 10.

2. A mass of mica flakes as claimed in claim 1, wherein the median shape factor is not less than 0.78.

3. A mass of mica flakes as claimed in claim 1, wherein the average grain size is not more than 500 μm.

4. A mass of mica flakes as claimed in claim 1, wherein the average aspect ratio is not less than 15.

5. A mass of mica flakes as claimed in claim 1, wherein mica flakes having a shape factor of not more than 0.70 account for not more than 20 percent in number in said mass of mica flakes.

6. A resin composition essentially comprising mica flakes characterized by a median shape factor of not less than 0.76, an average particle size of not more than 2,000 μm and an average aspect ratio of not less than 10 and a resin.

7. A resin composition as claimed in claim 6, wherein said mica flakes are used in an amount of 0.1–4 parts by weight per part by weight of resin when said resin is a thermoplastic resin or in an amount of 0.03–3 parts by weight per part of resin when said resin is a thermosetting resin.

8. A resin composition as claimed in claim 6, wherein said resin is a thermosetting resin and wherein a fibrous reinforcement is further present in an amount of 0.03–10 parts by weight per part by weight of resin.

9. A resin composition as claimed in claim 6, which contains an organic silane compound incorporated therein.

* * * * *